(12) United States Patent
Beeken et al.

(10) Patent No.: US 7,551,853 B2
(45) Date of Patent: Jun. 23, 2009

(54) DATA COMMUNICATIONS APPARATUS

(75) Inventors: Christopher B. E. Beeken, Hampshire (GB); John M. Clifton, Hertfordshire (GB); Jonathan I. Settle, Hampshire (GB); Dale R Burr, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 11/213,493

(22) Filed: Aug. 27, 2005

(65) Prior Publication Data

US 2006/0047871 A1 Mar. 2, 2006

(30) Foreign Application Priority Data

Sep. 2, 2004 (GB) .................................. 0419430

(51) Int. Cl.
*H04B 10/20* (2006.01)
*H04J 14/02* (2006.01)

(52) U.S. Cl. .............................. 398/59; 398/58; 398/79; 398/90

(58) Field of Classification Search .................. 398/58, 398/59, 79, 90
See application file for complete search history.

(56) References Cited

U.S. PATENT DOCUMENTS

| 6,073,209 | A  | * | 6/2000  | Bergsten ...................... 711/114 |
| 6,504,817 | B2 | * | 1/2003  | Oldfield et al. .............. 370/217 |
| 6,560,673 | B2 | * | 5/2003  | Elliott ......................... 711/114 |
| 6,718,139 | B1 | * | 4/2004  | Finan et al. .................... 398/59 |
| 6,724,789 | B2 | * | 4/2004  | Vujkovic-Cvijin ............ 372/32 |
| 2002/0181503 | A1 | * | 12/2002 | Montgomery, Jr. .......... 370/468 |
| 2004/0139260 | A1 | * | 7/2004  | Steinmetz et al. ........... 710/269 |
| 2004/0257890 | A1 | * | 12/2004 | Lee et al. ..................... 365/200 |

FOREIGN PATENT DOCUMENTS

EP 577362 A2 * 1/1994

* cited by examiner

*Primary Examiner*—Ken N Vanderpuye
*Assistant Examiner*—Daniel G Dobson
(74) *Attorney, Agent, or Firm*—Jeffrey P. Aiello

(57) ABSTRACT

An apparatus achieves data communications between a data storage controller and data storage devices within a data storage system via an optical network. The apparatus includes a wavelength division multiplexing logic for simultaneously establishing, on the optical network, a number of arbitrated communications loops between the controller and the data storage system, for communicating data between the controller and the storage devices.

10 Claims, 4 Drawing Sheets

DATA COMMUNICATIONS APPARATUS

RELATED APPLICATIONS

The present patent application claims priority under 35 USC 119 to the previously filed United Kingdom (UK) patent application entitled "Data communications apparatus," filed on Sep. 2, 2004, and assigned serial no. 0419430.4.

FIELD OF THE INVENTION

The present invention relates generally to a data communications apparatus and more particularly relates to such an apparatus for achieving data communications between a data storage controller and data storage devices within a data storage system.

BACKGROUND OF THE INVENTION

A data processing system typically includes a host computer system connected via a storage controller to a bulk data storage system storing computer programs and data. An example of a conventional data storage system is described in U.S. Pat. No. 6,560,673. The host typically includes a central processing unit (CPU), a memory subsystem, and an input/output (I/O) subsystem interconnected by a bus subsystem. The memory subsystem usually includes relatively high-speed memory devices, such as solid-state random-access memory (RAM) devices and read-only memory (ROM) devices. In operation, the memory subsystem stores data and program code executable by the CPU. The CPU executes the program code to manipulate the data. The I/O subsystem typically includes the following: at least one user input device, such as a keyboard, mouse, and/or the like; at least one user output device such as a visual display unit, printer, and/or the like; and, at least one communications adapter for connecting the host to one or more similar systems via an intervening wired or wireless data communications network.

Infrequently needed computer program code and data can be stored in the data storage system. To facilitate such storage, the data storage system typically includes an enclosure housing a number of removable data storage devices, such as magnetic or optical disk drive storage devices. The enclosure may have a back plane bus subsystem to which the storage devices are connected. An I/O adapter may also be connected to the back plane. In operation, the I/O adapter facilitates communications between the devices in the enclosure and the storage controller.

The storage controller is usually similar in structure to the host. Specifically, the controller typically includes a CPU, a memory subsystem, and an I/O subsystem interconnected by a bus subsystem. However, in the controller, the CPU is dedicated, by program code stored in the memory subsystem, to controlling the data storage system, and in particular the flow of data and program code between the host and the data storage system.

Communications between the controller and the data storage system is typically achieved via an arbitrated loop communications network. The loop of such a network can only carry one signal at any one time. Therefore, the controller can only communicate with a storage device in the data storage system after having first reserved an interval of time in which to communicate with this device on the loop. During that interval, the controller cannot communicate with other storage devices. The net result is a communications limitation, which is disadvantageous. That is, regardless of the speed of the storage devices and the intervening connections, only one storage device can perform I/O operations at any given time. For this and other reasons, there is a need for the present invention.

SUMMARY OF THE INVENTION

In accordance with the present invention, an apparatus is provided for achieving data communications between a data storage controller and data storage devices within a data storage system via an optical network. The apparatus includes wavelength division multiplexing (WDM) logic for simultaneously establishing, by wavelength division multiplexing, a number of arbitrated communications loops extending between the controller and the data storage system on the optical network for communicating data between the controller and the storage devices. The multiple loops allow multiple storage devices to perform I/O operations simultaneously, thus alleviating the limitations of the prior art described in the background.

In one embodiment of the present invention, control logic is provided for controlling data communications between the controller and the data storage system via the arbitrated communications loops. The control logic includes prioritization logic for assigning different subsets of the storage devices to different subsets of the arbitrated loops. The prioritization logic may assign a different storage device to a different arbitrated loop. The control logic may include fairness logic for distributing access to the arbitrated loops among the storage devices. The control logic may also include a queuing logic for controlling queues of data to be communicated via the optical network. The control logic can further include collision avoidance logic for allocating different data storage devices to different arbitration loops to achieve simultaneous communications between the controller and the data storage devices.

A data storage controller according to an embodiment of the invention includes: a central processing unit; a memory subsystem; an input/output subsystem to at least communicate with an optical network on which storage devices are connected; a bus subsystem interconnecting the central processing unit, the memory subsystem, and the input/output subsystem; and, WDM logic. The WDM logic is executed by the central processing unit from the memory subsystem. The WDM logic is for simultaneously establishing a number of arbitrated communications loops extending between the controller and the data storage system for communicating data between the controller and the storage devices of the data storage system. The multiple loops allow multiple storage devices to perform I/O operations simultaneously.

A data processing system according to an embodiment of the invention includes: an optical network; a data storage controller; and, a data storage system connected to the data storage controller via the optical network. The optical network includes a back plane bus subsystem for the data storage system. The data storage controller can include WDM logic for simultaneously establishing a number of arbitrated communications loops extending between the controller and the data storage system on the optical network for communicating data between the controller and storage devices of the data storage system. The multiple loops allow multiple storage devices to perform I/O operations simultaneously.

A method according to an embodiment of the invention is for achieving data communications between a data storage controller and data storage devices in a data storage system via an optical network. The method simultaneously establishes, by WDM on the optical network, a number of arbitrated communications loops between the controller and the data storage system for communicating data between the controller and the storage devices.

An article of manufacture of an embodiment of the invention includes a computer-readable medium and means in the medium. The computer-readable medium may be a recordable data storage medium, a modulated carrier signal, or another type of computer-readable medium. The means is for simultaneously establishing, by WDM on an optical network, a number of arbitrated communications loops between a controller and a data storage system on the optical network, for communicating data between the controller and storage devices on the optical network.

In one embodiment of the invention, a controller and a number of storage devices are provided that are connected to an optical ring communication line on which multiple arbitrated loops are established via WDM. Each loop employs a different wavelength of light. Thus, each loop can transmit simultaneously without interfering with the other loops. This solves the bandwidth limitation associated with conventional arbitrated loops that has been described. Additional cables are not needed.

Still other aspects, embodiments, and advantages of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
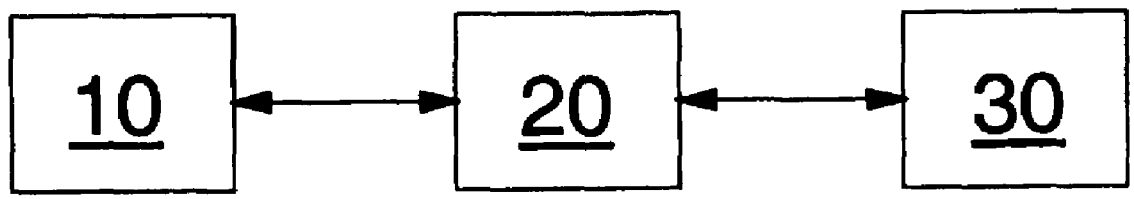
FIG. 1 is a block diagram of a data processing system, according to an embodiment of the invention.

Referring first to FIG. 1, a data processing system of one embodiment of the invention includes a host computer system 10 connected via a storage controller 20 to a bulk data storage system 30 storing computer programs and data. In operation, the host 10 accesses the programs and data from the data storage system via the controller 20. Communications between the host 10 and the controller 20 are achieved via an intervening data communications network. The network may be wired or wireless, local area or wide area, or involve a combination of wired, wireless, local area, and wide area technologies.

Figure 2:
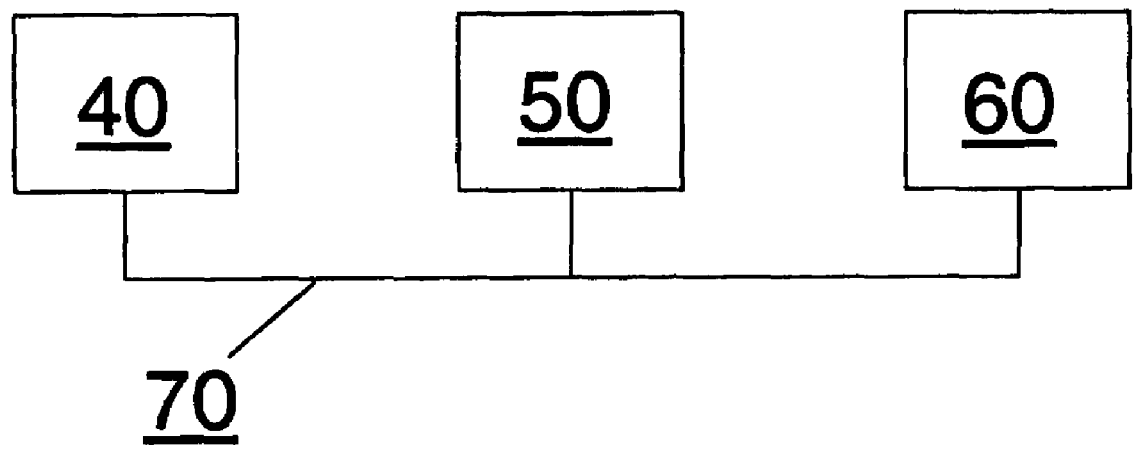
FIG. 2 is a block diagram of a host computer system of the data processing system, according to an embodiment of the invention.

Referring now to FIG. 2, the host 10 typically includes a CPU 40, a memory subsystem 50, and an I/O subsystem 60 interconnected by a bus subsystem 70. The memory subsystem 50 includes relatively high-speed memory devices such as solid-state random-access memory (RAM) devices and read-only memory (ROM) devices. In operation, the memory subsystem 50 stores data and program code executable by the CPU 40. The CPU 40 executes the program code to manipulate the data. The I/O subsystem 60 typically includes: at least one user input device such as a keyboard, mouse, and/or the like; at least one user output device such as a visual display unit, printer, and/or the like; and, at least one communications adapter for connecting the host 10 to one or more similar systems, such as the controller 20, via one or more intervening wired or wireless data communications networks.

Figure 3:
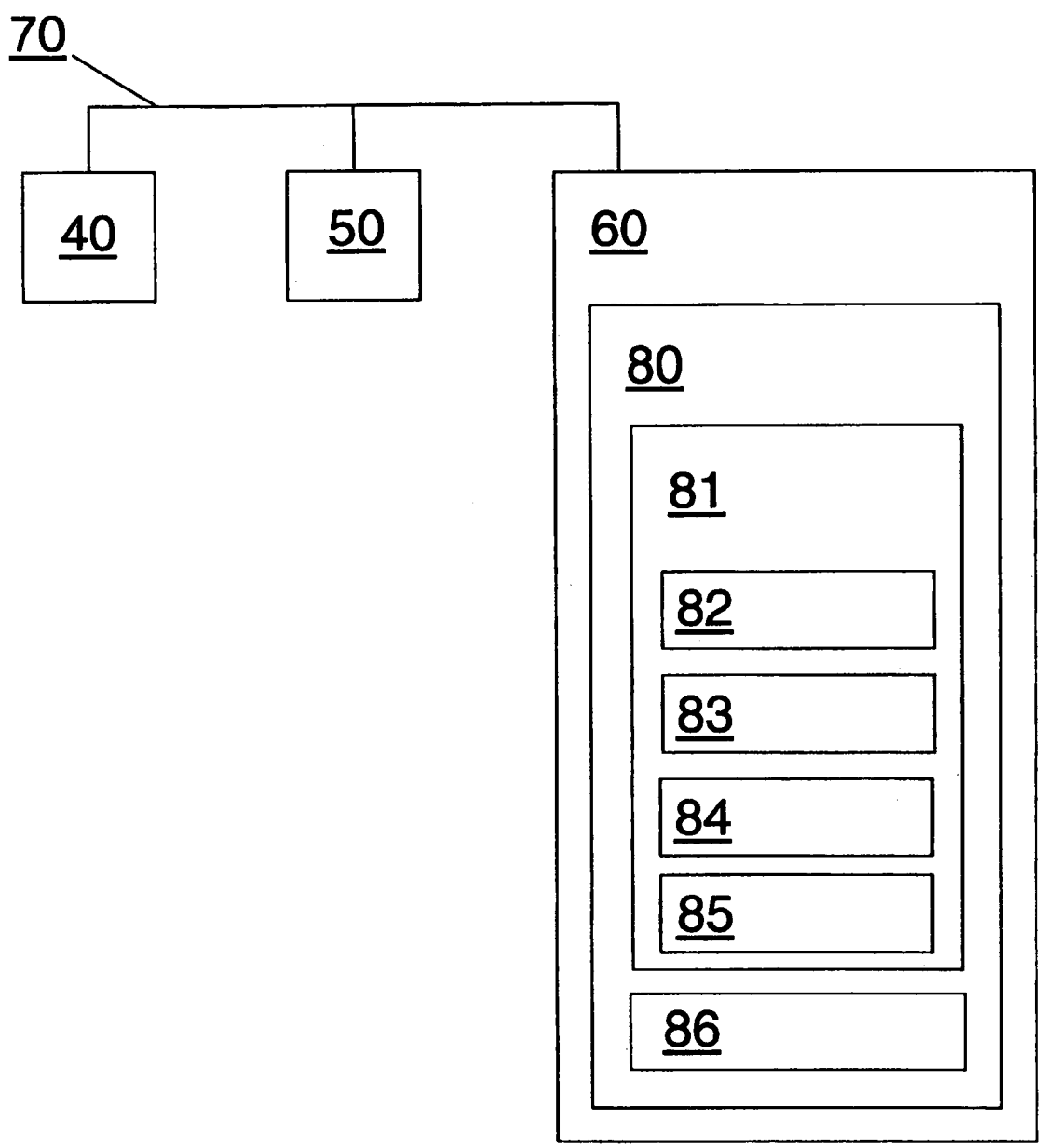
FIG. 3 is a block diagram of a storage controller of the data processing system, according to an embodiment of the invention.

Turning to FIG. 3, the controller 20 is similar in structure to the host 10. Specifically, the controller 20 includes a CPU 40, memory subsystem 50 and I/O subsystem 60 interconnected by a bus subsystem 70. However, in the controller 20, the CPU 40 is dedicated by program code stored in the memory subsystem 50 to controlling the data storage system 30 and in particular the flow of data and program code between the host 10 and the data storage system 30. The I/O subsystem 60 of the controller 20 includes a storage adapter 80 for communicating with the data storage system 30.

Figure 4:
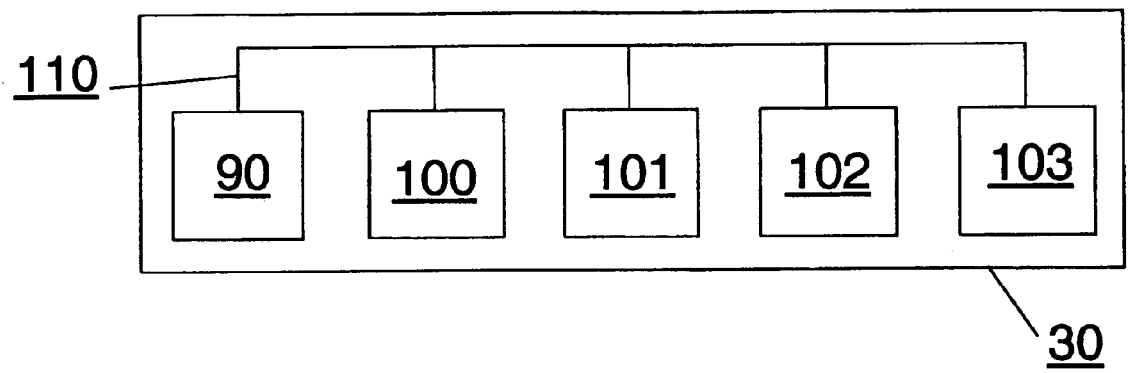
FIG. 4 is a block diagram of a data storage system of the data processing system, according to an embodiment of the invention.

Referring to FIG. 4, the data storage system 30 includes an enclosure housing a number of removable data storage devices 100-103 such as magnetic or optical disk drive storage devices. The enclosure has a back plane bus subsystem 110 to which the storage devices 100-103 are detachably connected. An I/O adapter 90 is also connected to the back plane 110. The I/O adapter 90 facilitates communications between the storage devices 100-103 in the enclosure and the controller 20. The back plane 110 is implemented by electrically conductive signal lines such as copper signal lines.

In operation, infrequently needed computer program code and data are stored in the data storage system 30 rather than the host 10. When necessary, the host 10 recovers such data and code from the data storage system 30 via the controller 20. Similarly, the host 10 may store data or code in the storage system 30 via the controller 20.

Returning to FIG. 3, the storage adapter 80 in the controller 20 includes control logic 81 and wavelength division multiplexing (WDM) logic 86. The control logic 81 includes collision avoidance logic 82, prioritization logic 83, queue logic 84, and fairness logic 85. The control logic 81 is described in detail later in the detailed description.

Figure 5:
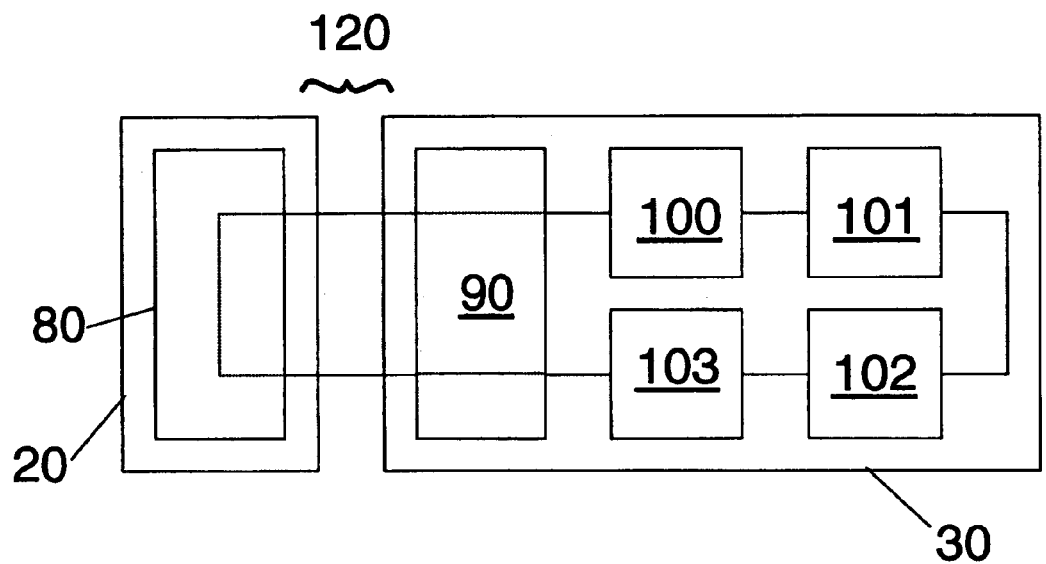
FIG. 5 is a block diagram of the storage controller and the data storage system, according to one embodiment of the invention.

Referring now to FIG. 5, the I/O adapter 90 in the storage system 30 also includes WDM logic (not shown). The WDM logic in the storage adapter 80 and the I/O adapter 90 includes wavelength division multiplexer and demultiplexer functions. An optical ring communications network 120 extends between the storage adapter 80 and the I/O adapter 90. The network 120 includes send and receive optical fiber communications lines. The send and receive lines complete the ring.

Communications between the storage adapter 80 and the I/O adapter 90 is achieved, or effected, via the network 120. In the storage system 30, the WDM logic of the I/O adapter 90 couples the network 120 to the back plane 110. Similarly, in the controller 20, the WDM logic 86 of the storage adapter 80 couples the network 120 to the bus subsystem 70 and, in turn, to the host 10.

The WDM logic in the storage adapter 80 and the I/O adapter 90 permits the establishment of multiple arbitrated loops on the network 120 via WDM. Each loop employs a different wavelength of light. Thus, each loop can transmit simultaneously without interfering with the other loops. This greatly improves performance. For example, a forty-channel WDM scheme permits simultaneous communications with around forty storage devices 100-103. This provides a performance increase of up to 40 times over conventional arbitrated loop communication schemes. WDM technology typically permits data transmissions at around 2.5 gigabits per second (Gb/s).

In one embodiment of the present invention, the multiplexer function of the WDM logic in both the storage adapter 80 and the I/O adapter 90 includes a number of lasers. Each of the lasers emits a different wavelength of light. Each wavelength corresponds to a different channel of the WDM scheme. The demultiplexer function of the WDM logic in both the storage adapter 80 and the I/O adapter 90 includes a number of photodetectors. Each photodetector is tuned to detect a different one of the wavelengths. Thus, each photodetector is assigned to a different one of the channels. Each of the channels is assigned to a different one of the storage devices 100-103. The lasers and photodetectors are optically coupled to the ring network 120. It will be appreciated that the lasers occupy considerable physical space in the storage adapter 80 and the I/O adapter 90.

In another embodiment of the present invention, the WDM logic of both the storage adapter 80 and the I/O adapter 90 includes a tunable laser. The tunable laser can be electrically tuned to selectively transmit light at different wavelengths. Thus, the tunable laser can be employed to sequentially transmit each channel on the optical network 120. Such lasers are available, for example, from Gigatera, Inc. Similarly, the storage adapter 80 and I/O adapter 90 may each include a photodetector for discriminating between light of different wavelengths thus permitting recovery of each channel. It will be appreciated that the tunable laser and discriminating photodetector occupy less physical space than the multiple lasers and corresponding photodetectors. Accordingly, the tunable laser and discriminating photodetector permit a more compact storage adapter 80 and I/O adapter 90.

In operation, the control logic 81 in the storage adapter 80 of the controller 20 controls communications between the controller 20 and the storage devices 100-103. As previously indicated, the control logic 81 includes logic 82-85 implementing a number of different control algorithms for controlling communications between the controller 20 and the storage devices 100-103.

The collision avoidance logic 82 configures the controller 20 to ensure that, at any instant, each storage device 100-103 communicates on a different one of the arbitrated loops. This is achieved by the collision avoidance logic 82 allocating a different loop to each of the storage devices 100-103 to be communicated with. The collision avoidance logic 82 maintains a lookup table. The lookup table may be stored on the storage adapter 80. Alternatively, the lookup table may be stored in the memory subsystem 50 and the controller 20. The lookup table maps each of the loops to different ones of the storage devices 100-103. The lookup table is updated by the collision avoidance logic 82 as the loops are assigned and reassigned. The collision avoidance logic 82 thus keeps track of which loop is being used by which storage device 100-103 at any instant in time.

The queue logic 84 establishes and manages a queue of data to be communicated in the controller 20. A pseudo-code example of the queue logic 84 is provided below:

```
ProcessIO( )
{
    if (a loop is already in use for this disk)
    {
        place the IO on the queue for this loop
    }
    else
    {
        reserve a loop for this disk
        create an IO queue for this loop
        place the IO on the new queue
    }
}
```

In operation, the fairness logic 85 prevents the network 120 from being monopolized by a subset of the storage devices 100-103. This is particularly helpful in the event that there are more storage devices 100-103 in the data storage system 30 than WDM channels available in the network 120.

The prioritization logic 83, in operation, assigns different subsets of the storage devices 100-103 to different subsets of the WDM channels. Each storage device 100-103 is thus available only via assigned WDM channels. Accordingly, some storage devices 100-103 can be assigned a greater priority than others. It will be appreciated that the most important storage devices 100-103 may be assigned dedicated channels.

In one embodiment of the invention, each of the prioritization logic 81, fairness logic 82, collision avoidance logic 82, and queue logic 84 can be selectively activated and deactivated according to user preference and/or the demands of a specific application.

It will be appreciated that, in some embodiments of the invention, the fairness logic 85 may be omitted. Likewise, it will be appreciated that, in some embodiments of the invention, the prioritization logic 83 may be omitted.

As previously indicated, in one embodiment of the invention, the WDM logic of the I/O adapter 90 of the storage system 30 includes a demultiplexing function for demultiplexing a WDM signal received from the network 120 into a number of separate signals each of a different wavelength. The separate signals are then processed in parallel within the storage system 30. Also as previously indicated, communications between the I/O adapter 90 and the storage devices 100-103 is achieved via electrically conductive signal lines in the back plane 110. It will be appreciated that, in the storage system 30, the enclosure, data storage devices 100-103, and back plane 110 need not be modified to facilitate implementation of an embodiment of the invention. Instead, an embodiment of the invention can be simply implemented by provision in the storage system 30 of an I/O adapter 90 having the aforementioned WDM logic. Accordingly, it will be appreciated then that some embodiments of the invention may employ a substantial amount of conventional hardware.

Figure 6:
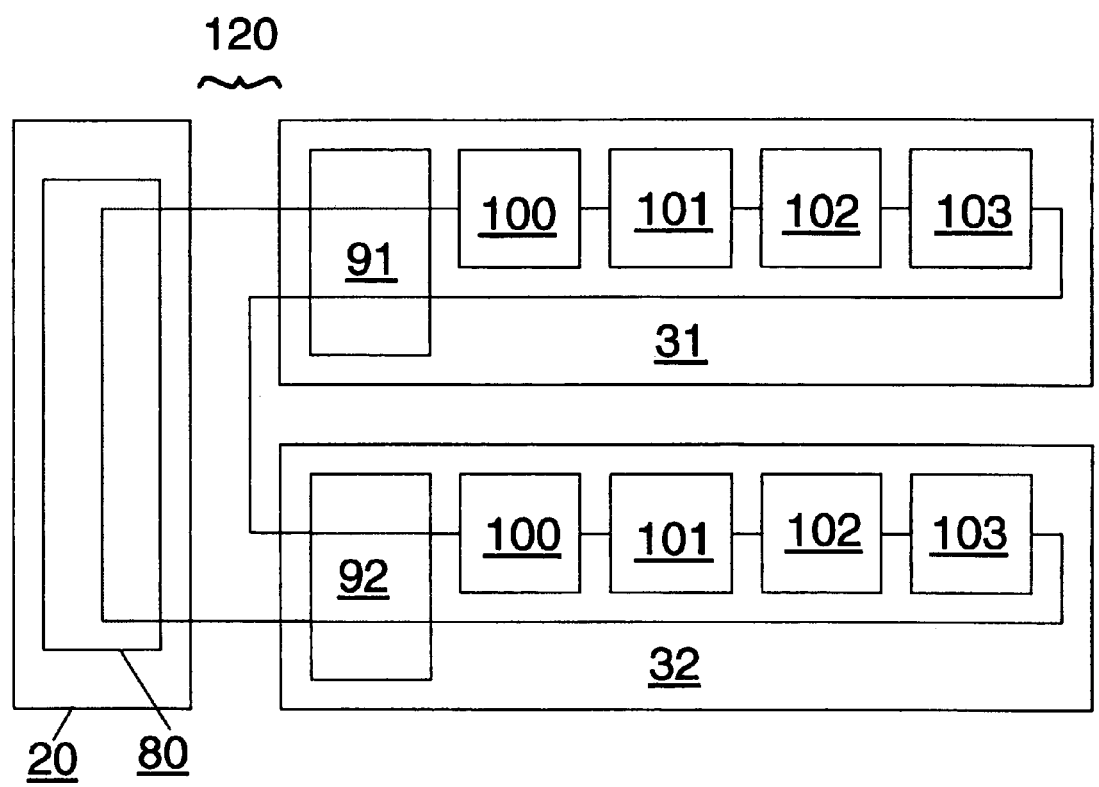
FIG. 6 is a block diagram of the storage controller and the data storage system, according to another embodiment of the invention.

Referring now to FIG. 6, in another embodiment of the invention the storage system 30 includes first and second similar enclosures 31 and 32 connected in series. The first enclosure 31 includes a first I/O adapter 91 receiving WDM signals from the storage adapter 80. The second enclosure 32 includes a second I/O adapter 92 sending WDM signals to the storage adapter 80. The first I/O adapter 91 sends WDM signals to the second I/O adapter 92. The storage devices 100-103 are thus serially coupled along the network 120. It will be appreciated that the storage system 30 may include more than two enclosures coupled together on the network 120. In a particular embodiment of the invention, the controller 20 includes a number of storage adapters 80 to provide back up in the event of a failure in one of storage adapters 80.

In the embodiments of the invention that have been described thus far, the back plane 110 in the storage system 30 includes electrically conductive signal lines for effecting communications between the storage devices 100-103 and the I/O adapter 90. However, in other embodiments of the invention, the back plane 110 may include optical communication paths for effecting, or achieving, communications between the storage devices 100-103 and the I/O adapter 90. In such embodiments, the storage devices 100-103 may be provided with transducer technology such as photodetectors and lasers for converting optical transmissions into electrical transmissions and vice versa. It will be appreciated that, in such embodiments, the I/O adapter 90 may simply extend the network 120 within the storage system 30.

In one embodiment of the invention, communications between the controller 20 and the storage system 30 is effected via Coarse Wave Division Multiplexing (CWDM). CWDM provides similar benefits to those of WDM. However, in CWDM, the wavelengths employed for transmission are spread further apart than in WDM. Thus, CWDM can be implemented via cheaper and less accurate components.

Embodiments of the invention may offer limited improvement in performance where the storage adapter 80 is mainly communicating with only one of the storage devices 100-103. However, performance is greatly improved over conventional system where the storage adapter 80 is communicating with many of the storage devices 100-103. In the best case, performance increase is substantially proportional to the number of WDM channels. For example, forty-channel WDM provides a forty-fold performance increase.

As has been described, embodiments of the invention may be integrated in the controller 20 and the storage system 30. Alternatively, the invention may be at least partially embodied in an interposer device disposed between the controller 20 and storage system 30.

The WDM logic that has been described may be implemented fully in hardwired circuitry. Alternatively, the WDM logic may be implemented party in hardwired circuitry and partly in computer program code executable by, for example, a microprocessor. Similarly, the aforementioned control logic 81 may be implemented in software stored in the memory subsystem 50 of the controller 20 for execution by the CPU 40 of the controller 20. Alternatively, the control logic 81 may be implemented partly in hardwired logic circuitry and partly in computer program code.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

What is claimed is:

1. An apparatus for achieving data communications between a data storage controller and data storage devices in a data storage system via an optical network, the apparatus comprising:

wavelength division multiplexing logic for simultaneously establishing by wavelength division multiplexing a plurality of arbitrated communications loops extending between the controller and the data storage system on the optical network for communicating data between the controller and the storage devices; and, control logic for controlling data communications between the controller and the data storage system via the arbitrated communications loops, wherein the control logic comprises queuing logic for controlling queues of data to be communicated via the optical network, each queue corresponding to one of the arbitrated communications loops, such that when the data storage controller is to send data to a given data storage device:

where an arbitrated communications loop is already in use for the given data storage device, the control logic is to place the data on a queue for the arbitrated communications loop that is already in use for the given data storage device;

where an arbitrated communications loop is not yet in use for the given data storage device, the control logic is to reserve a selected arbitrated communications loop for the given data storage device, is to create a queue for the selected arbitrated communications loop, and is to place the data on the queue that has been created, wherein the control logic further comprises collision avoidance logic to ensure that, at any instant, each data storage device communicates on a different loop of the arbitrated communications loops, and wherein the wavelength division multiplexing logic comprises a single tunable laser to communicate data over all the arbitrated communications loops, the single tunable laser tunable to selectively transmit light at different wavelengths of light, each wavelength of light corresponding to one of the arbitrated communications loops.

2. The apparatus of claim 1, wherein the control logic further comprises prioritization logic for assigning different subsets of the storage devices to different subsets of the arbitrated loops.

3. The apparatus of claim 2, wherein the prioritization logic assigns a different one of the storage devices to a different one of the arbitrated loops.

4. The apparatus of claim 1, wherein the control logic further comprises fairness logic for distributing access to the arbitrated loops among the storage devices.

5. The apparatus of claim 1, wherein the apparatus is the data storage controller and further comprises:

a central processing unit;

a memory subsystem;

an input/output subsystem to communicate with the optical network on which the storage devices of the data storage system are connected; and, a bus subsystem interconnecting the central processing unit, the memory subsystem, and the input/output subsystem.

6. A data processing system comprising:

an optical network;

a data storage system having a plurality of storage devices and connected to the optical network; and, a data storage controller connected to the optical network and having wavelength division multiplexing logic for simultaneously establishing by wavelength division multiplexing a plurality of arbitrated communications loops extending between the data storage controller and the data storage system, for communicating data between the data storage controller and the storage devices, wherein the data storage controller further has control logic for controlling data communications between the data storage controller and the data storage system via the arbitrated communications loops, wherein the control logic comprises queuing logic for controlling queues of data to be communicated via the optical network, each queue corresponding to one of the arbitrated communications loops, such that when the data storage controller is to send data to a given data storage device:

where an arbitrated communications loop is already in use for the given data storage device, the control logic is to place the data on a queue for the arbitrated communications loop that is already in use for the given data storage device;

where an arbitrated communications loop is not yet in use for the given data storage device, the control logic is to reserve a selected arbitrated communications loop for the given data storage device, is to create a queue for the selected arbitrated communications loop, and is to place the data on the queue that has been created, wherein the control logic further comprises collision avoidance logic to ensure that, at any instant, each data storage device communicates on a different loop of the arbitrated communications loops, and wherein the wavelength division multiplexing logic comprises a single tunable laser to communicate data over all the arbitrated communications loops, the single tunable laser tunable to selectively transmit light at different wavelengths of light, each wavelength of light corresponding to one of the arbitrated communications loops.

7. The data processing system of claim 6, wherein the optical network comprises a back plane bus subsystem of the data storage system.

8. The data processing system of claim 6, wherein the control logic further comprises at least one of:

prioritization logic for assigning different subsets of the storage devices to different subsets of the arbitrated loops; and fairness logic for distributing access to the arbitrated loops among the storage devices.

9. A method for achieving data communications between a data storage controller and data storage devices in a data storage system via an optical network, the method comprising:

simultaneously establishing, via wavelength division multiplexing logic using wavelength division multiplexing on the optical network, a plurality of arbitrated communications loops between the controller and the data storage system, for communicating data between the controller and the storage devices; and, controlling data communications between the data storage controller and the data storage system via control logic using the arbitrated communications loops, wherein the control logic uses queuing logic for controlling queues of data to be communicated via the optical network, each queue corresponding to one of the arbitrated communications loops, such that when data is to be sent from the data storage controller to a given data storage device:

where an arbitrated communications loop is already in use for the given data storage device, the control logic places the data on a queue for the arbitrated communications loop that is already in use for the given data storage device;

where an arbitrated communications loop is not yet in use for the given data storage device, the control logic reserves a selected arbitrated communications loop for the given data storage device, creates a queue for the selected arbitrated communications loop, and places the data on the queue that has been created, wherein the control logic further uses collision avoidance logic to ensure that, at any instant, each data storage device communicates on a different loop of the arbitrated communications loops, and wherein the wavelength division multiplexing logic uses a single tunable laser to communicate data over all the arbitrated communications loops, the single tunable laser to selectively transmit light at different wavelengths of light, each wavelength of light corresponding to one of the arbitrated communications loops.

10. The method of claim 9, wherein controlling the data communications between the data storage controller and the data storage system via the arbitrated communications loops comprises at least one of:

assigning different subsets of the storage devices to different subsets of the arbitrated loops; and, distributing access to the arbitrated loops among the storage devices.

* * * * *